April 19, 1966                C. W. CHAPMAN                3,246,485
         COUPLINGS FOR TRANSMITTING A DRIVE BETWEEN ROTATABLE
                       DRIVING AND DRIVEN MEMBERS
Filed Nov. 5, 1963                                    5 Sheets-Sheet 1
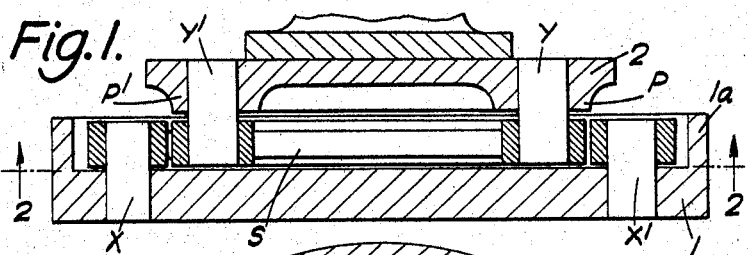
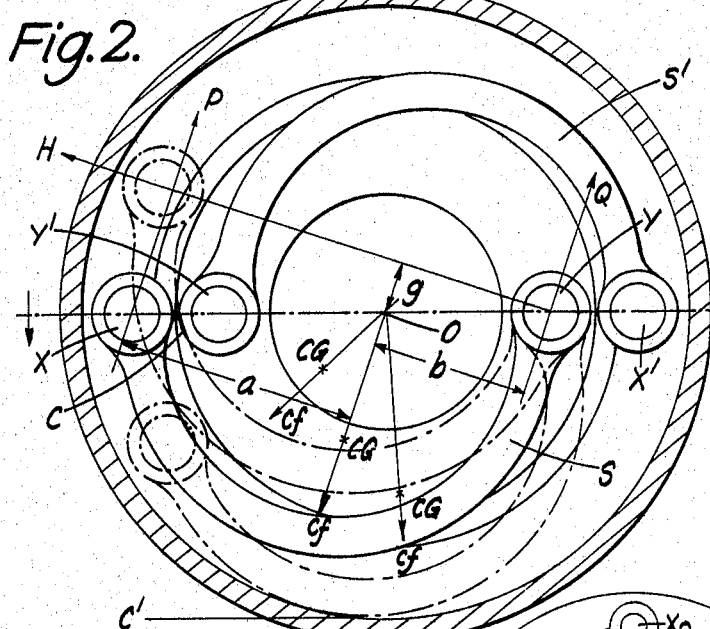
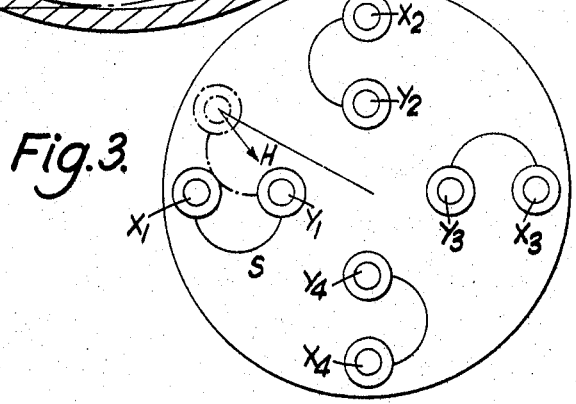
Inventor
Charles Wallace Chapman
his attorneys

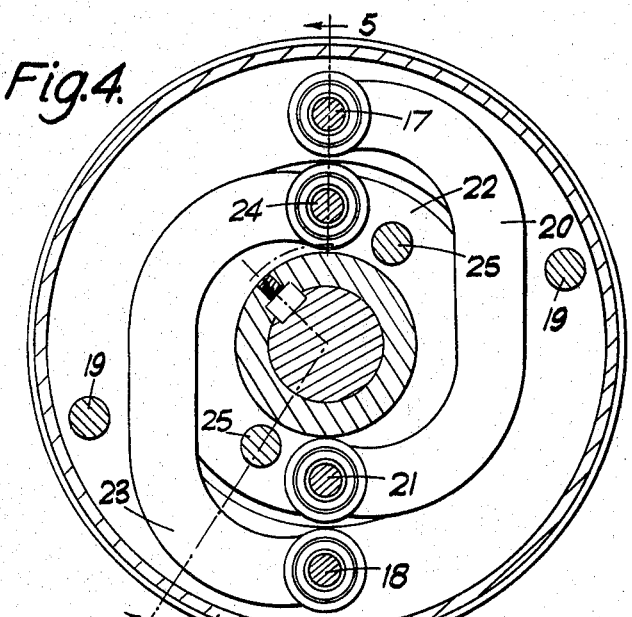
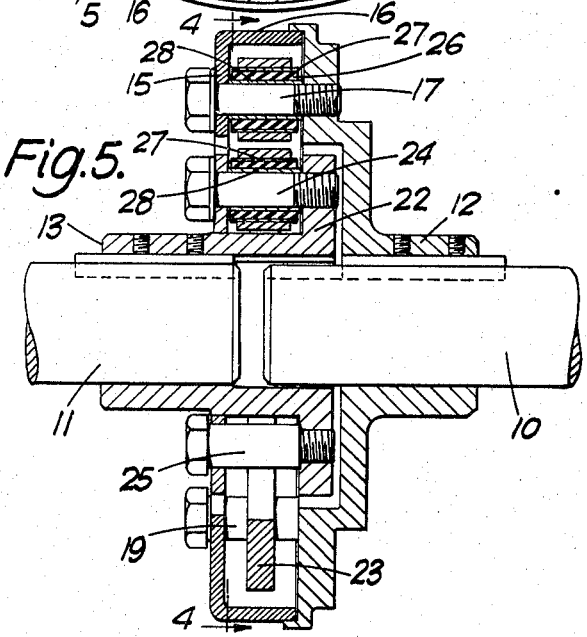

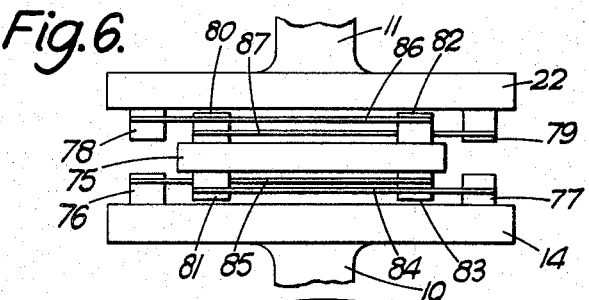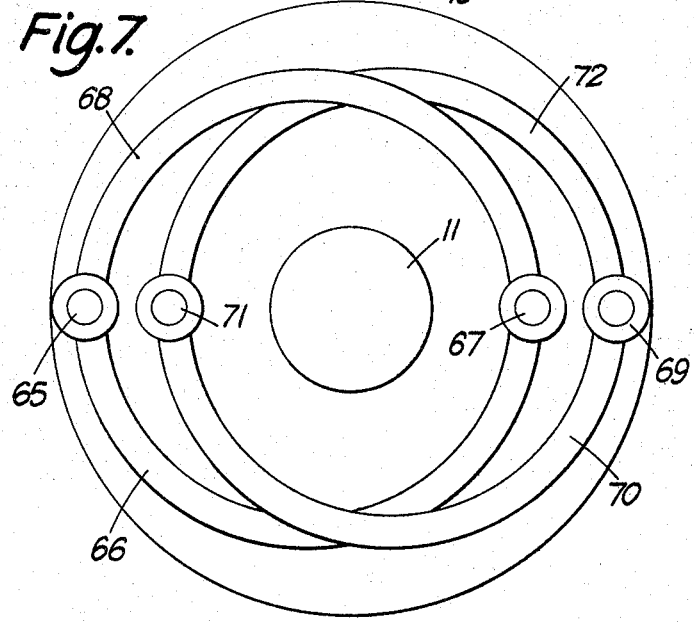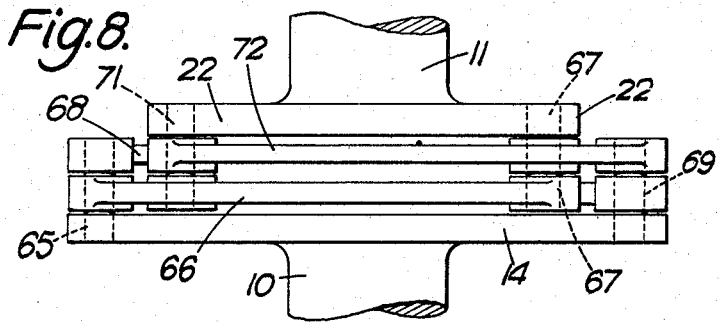
Inventor
Charles Wallace Chapman

April 19, 1966  C. W. CHAPMAN  3,246,485
COUPLINGS FOR TRANSMITTING A DRIVE BETWEEN ROTATABLE
DRIVING AND DRIVEN MEMBERS
Filed Nov. 5, 1963  5 Sheets-Sheet 4
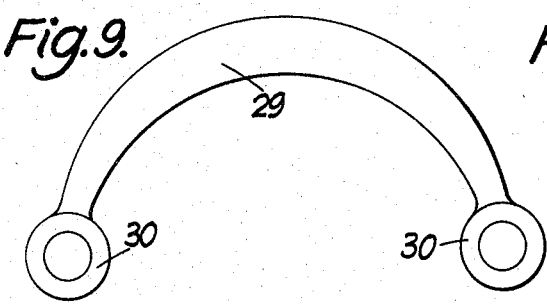
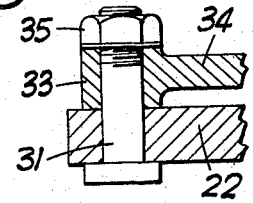
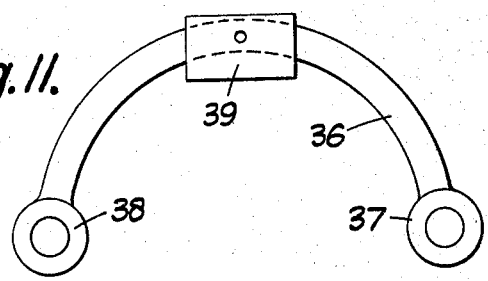
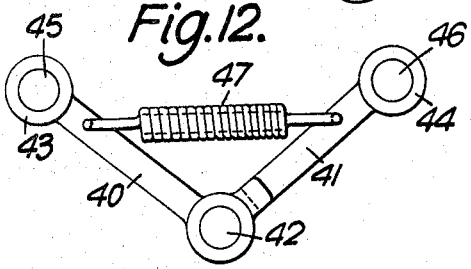
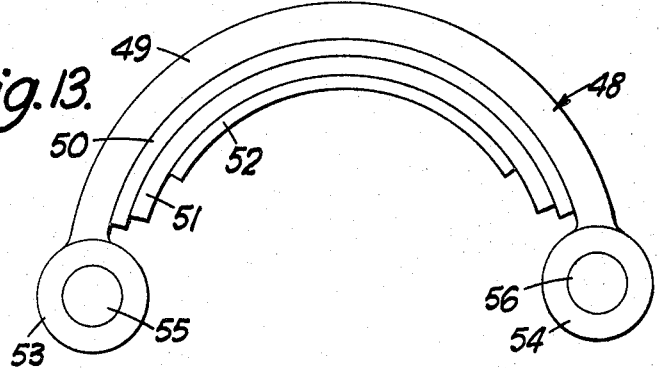
Inventor
Charles Wallace Chapman

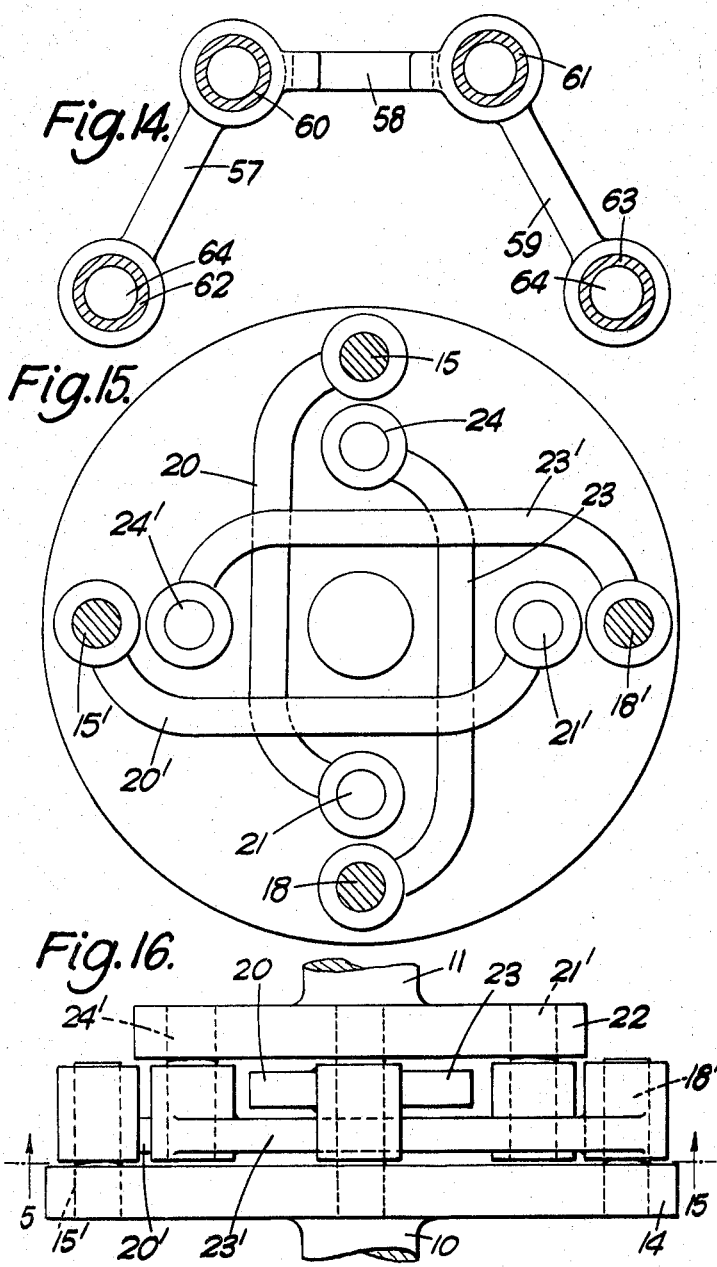

United States Patent Office 3,246,485
Patented Apr. 19, 1966

3,246,485
COUPLINGS FOR TRANSMITTING A DRIVE BETWEEN ROTATABLE DRIVING AND DRIVEN MEMBERS
Charles Wallace Chapman, Horley, Surrey, England, assignor to Twiflex Couplings Limited, Chesterfield, England, a British company
Filed Nov. 5, 1963, Ser. No. 321,532
Claims priority, application Great Britain, Nov. 6, 1962, 42,004/62
13 Claims. (Cl. 64—27)

This invention relates to a coupling for transmitting a drive between a rotatable driving and driven member and of the kind in which there are connected between said members a number of resilient elements.

One object of this invention is to provide a torsionally flexible coupling capable of transmitting torque partly or wholly by centrifugal forces developed in said resilient elements and which coupling has, over part of its deflection range no, or substantially no, stiffness, the stiffness increasing outside this part of the deflection range to prevent "hunting." It is well-known that if two or more rotating masses are coupled together so that the one drives the other or others, then if one of the masses for any reason vibrates torsionally (say the flywheel of an engine due to the uneven torque inpulses from the cylinders) it will tend to make the other mass or masses also torsionally vibrate, setting up vibratory stresses in the connections between the masses. Generally the masses and the connections between them will have one or more natural frequencies of vibration, and if a periodically fluctuating torque or its harmonics anywhere in the system has or have a periodicity equal to any of these natural frequencies resonance will occur. This may induce dangerously high stresses in one or more of the connections. If, however, the connection between the disturbed (or vibrating) mass and the other mass or masses has no stiffness over the above mentioned part range, then no vibratory torque can be transmitted from that mass to the others and no resonance can occur.

Thus another object of the invention is to provide a coupling which, whilst capable of transmitting torque, will eliminate, or substantially eliminate, the transmission of torsional vibrations from one part of a rotating mass system to another.

According to this invention a coupling of the kind referred to for transmitting a drive between rotatable driving and driven members is characterised in that at least one pair of resilient elements are so connected to said members of the coupling that the points of connection between the ends of a pair of elements or each pair of elements when more than one pair are employed and those members lie in a plane containing the axis of rotation of the coupling when the coupling is transmitting little or no torque.

In such an arrangement the weights and centre of gravity of said resilient connecting elements may be so proportioned that when the coupling is rotating the centrifugal forces on the elements transmit torque from the driving to the driven member without substantial bending of the element such that at any predetermined speed and torque the ends of the elements of each pair of elements remain in or close to said plane containing the axis of rotation of the couplings.

In the case where the coupling is for use in a drive in which the torque transmitted by the coupling varies as the square of the speed of rotation of the coupling, each element is so arranged as to have its centre of gravity spaced away from the axis of rotation of the coupling and is of such a weight and the points of connection between its ends and the driving and driven members are so disposed that at all speeds of rotation substantially the whole torque transmitted by the coupling is transmitted between the driving and driven members by the effect on those members of the centrifugal force acting on the elements.

Preferably each resilient element is so shaped that relative rotation between the driving and driven members causes the element to bend about axes substantially parallel to the axis of rotation of the coupling whereby the distance between its ends may alter.

In one arrangement according to the invention the whole of each element lies to one side of said plane. In such an arrangement the two elements of a pair may lie on opposite sides of said plane.

There may be provided two pairs of connecting elements and the points of connection between the ends of the elements of one pair and the driving and driven members lie in or close to one plane and the points of connection between the ends of the elements of the other pair and the driving and driven members lie in or close to another plane at right angles to the first said plane.

In any of the arrangements referred to above the points of connection between the ends of at least one element and the driving and driven members are disposed on the same side of the axis of rotation of the coupling.

In another arrangement the points of connection between the ends of at least one element and the driving and driven members are disposed on opposite sides of the axis of rotation of the coupling.

Stop means may be provided for limiting the extent of bending of each resilient element so as to increase its stiffness after a predetermined deflection.

In any of the arrangements referred to above each connecting element may be curved, for example, may be C-shaped.

Also in any of the arrangements referred to above each element may be formed from a number of laminations.

Again in any of the arrangements referred to above each element may be formed from a number of parts connected together along its length.

Also in any of the arrangements referred to above the cross sectional area of each element may increase from each end towards the centre of the element.

Preferably in all the arrangements referred to above the ends of each element are pivotally connected to the driving and driven members. Alternatively they may be rigidly clamped to the driving and driven members. In the case where they are pivotally connected a resilient material may be bonded between two metal sleeves fixed to the ends of the connecting elements and rotating members respectively.

The following is a more detailed description of a number of embodiments of the invention, reference being made to the drawings accompanying the provisional specification in which:

FIGURE 1 is a section on the line 1—1 of FIGURE 2 of one form of coupling;

FIGURE 2 is a section on the line 2—2 of FIGURE 1;

FIGURE 3 is a similar view to FIGURE 2 of an alternative form of coupling.

Reference is being made to the drawings accompanying the complete specification in which:

FIGURE 4 is a view somewhat similar view to that of FIGURE 2 showing an alternative form of coupling having different shaped elements and differently arranged stop means and is a section on the line 4—4 of FIGURE 5;

FIGURE 5 is a section on the line 5—5 of FIGURE 4;

FIGURE 6 is a side elevation of a coupling in which a floating member is provided between the two members of the coupling and is connected respectively to the couplings by linkages;

FIGURE 7 is a section on the line 7—7 of FIGURE 8 and of an alternative form of coupling capable of transmitting equal torques in either sense;

FIGURE 8 is a side elevation of the arrangement shown in FIGURE 7 looking from the top of that figure;

FIGURE 9 is a side elevation of an alternative form of resilient element for use in the above arrangement, the cross sectional area of which varies along its length;

FIGURE 10 is a section through the connection between an end of the link and one of the members of the coupling whereby these parts are rigidly clamped;

FIGURE 11 is a side elevation of another form of resilient link of constant cross sectional area and to which is secured a weight;

FIGURE 12 is a side elevation of a resilient element made up of two links pushed apart by a spring;

FIGURE 13 is a side elevation of another form of resilient element made up of a number of laminations;

FIGURE 14 is a side elevation of a resilient element made up of a number of links pivotally connected by resilient bushes;

FIGURE 15 is a section on the line 15—15 of FIGURE 16 showing another form of coupling in which two pairs of links are arranged at right angles to one another; and FIGURE 16 is a side elevation of the coupling shown in FIGURE 15.

Referring to the arrangement shown in FIGURES 1 and 2 the coupling comprises a driving member 1, shown as a flywheel with a projecting rim 1a and a driven member 2 arranged more or less co-axial with it. The driving member carries two pins X and $X^1$ disposed diametrically opposite one another and at equal distances from the centre O and preferably as near the rim 1a as practicable. The driven member 2 has as shown in FIGURE 1 two diametrically opposed bosses P and $P^1$ carrying pins Y and $Y^1$ at equal distances from the centre O but nearer the centre than X and $X^1$.

X is connected to Y by a substantially semi-circular resilient element S. This spring may be of constant section or its section may increase towards its mid-length to give constant stress as shown in FIGURE 9. Each end of the spring is formed with an eye to encircle and rotate on the pins. Bushes may be interposed between the insides of the eyes and the pins, and these bushes may be of metal, synthetic material, or rubber as shown in FIGURES 3 and 4. Since the rotary movement of the eyes or the pins is limited, such bushes may be of the known kind referred to earlier comprising rubber bonded between metal sleeves, where the angular movement twists the rubber in lieu of sliding contact as in an ordinary bearing. The springs are such that when fitted onto X and Y and unstressed X and Y are diametrically in line on opposite sides of centre O. If desired the spring may be stressed when fitted on X and Y when they are in line.

$X^1$ and $Y^1$ are similarly connected by a similar resilient element $S^1$ in the diametrically opposite half of the coupling so as to share the load equally with S and provide complete balance under all conditions of speed and load. Putting S in the top half and balance spring S' in the lower half (referring to FIGURE 2) reverses the torque characteristics for a given direction of rotation.

If desired the member 1 may be the driven member and the member 2 the driving member.

It will be appreciated that if one member be held and fixed and the other partially rotated in either direction, the driving pins will turn about centre O but the springs will turn about the fixed pins so that the distance between the eyes of each spring is reduced, at first very little and then more rapidly. This bends the spring and there is a force H trying to restore the spring to its original shape. The reaction of H causes a thrust from the moving pin to the fixed pin and the line of thrust is distance g from centre O. This puts a torque on the driven member about O, equal with two springs to 2Hg.

Executive rotary movement of the driving member relative to the driven member will put an excessive bending stress on the springs. To prevent this, the construction is preferably such that before the safe stress of the spring is exceeded, the spring, in the one direction, contacts the eye of the other spring as shown at C, or, in the other direction, contacts the flywheel (driving member) rim at $C^1$. As drawn X and $X^1$ may move plus or minus thirty degrees about O relative to Y and $Y^1$, i.e. the coupling has a total free swing of sixty degrees. If desired rubbing or noise reducing pads may be fitted between the contacting parts at C and $C^1$, such pads being attached either to the spring (or its eye) or the flywheel rim.

The torque transmitted from one member to the other by virtue of the deflection of the spring is negligible for small angular movements of one member relative to the other but increases rapidly with increase of relative movement.

It will further be appreciated that as the coupling rotates centrifugal forces (C.F.) affect the transmitted torque. For instance, if the centre of gravity of the spring and its pins be where indicated by the crosses marked CG, then the spring will exert a centrifugal force Cf along the lines shown.

Taking the case of the pins in line and the spring S shown in full, the Cf will act at a distance a from X and b from Y putting forces as indicated by P and Q, on these pins.

If X be driving in a clockwise direction, the reaction of the centrifugal force acting on Y will tend to make Y also rotate about O in a clockwise direction. If X is driving and moves upwards relative to line 1—1 in FIGURE 2 then both spring load H and Cf will work together to transmit torque to Y, but if the Cf be too great so that X is down relative to line 1—1, spring force H will tend to move Y anti-clockwise, whilst Cf will tend to move it clockwise. Thus centrifugal force may, according to the designed dimensions be utilised either to help or oppose the transmission of torque by the spring.

An interesting case is where the coupling is used as a connection between say an engine and reverse gear on a marine drive where the propeller torque is a function (approximately) of the squares of the speed. Since Cf also varies as the square of the speed the coupling may theoretically be designed such that at all speeds (and powers) the four pins remain in line and the torque is transmitted purely by the centrifugal force.

In FIGURES 1 and 2 the pins X and Y have been shown on opposite sides of centre O, but if desired X and Y may be on the same side of the centre as shown in FIGURE 3. In this case, assuming the pins $X_1$ $X_2$ $X_3$ $X_4$ to be on the driving member partial rotation of the driving member in a clockwise direction relative to the driven member (carrying the pins $Y_1$ $Y_2$ $Y_3$ $Y_4$) will tend to straighten the spring S, but still introducing restoring forces H as before. Centrifugal effects will be less, but there may be a multiplicity of pins and springs. In FIGURE 4 four sets are shown.

For a constant speed drive the stiffness and weight of the springs may be adjusted in the design stage to distribute the torque transmission to the best effect between the spring and centrifugal forces.

The characteristics of a given size coupling may be varied by the use of alternative springs, and in certain of the arrangements referred to above by pre-stressing them when fitted with the pins diametrically in line, or by adjusting the weights of the springs or adding weights to them to increase the centrifugal force.

FIGURES 4 and 5 show a similar arrangement to that of FIGURES 1 and 2 but in more detail. In this arrangement two shafts 10 and 11 which are to be coupled together have secured to them flanged hubs 12 and 13 respectively. The flange 14 of the hub 12 has secured to it an annular member 15 having a rim portion 16 which is recessed in the flange 14. These parts are clamped together by pivot screws 17, 18 and stop screws 19. Pivoted to the pivot screw 17 is one end of a comparatively rigid flattened C-shaped element 20 the other end of which is pivoted to a pivot screw 21 secured to the flange 22 of the hub 13. The outer edge of the C-shaped element is arranged opposite one of the stop screws 19.

Another flattened C-shaped resilient element 23 is pivoted at one end on the pivot screw 18 which is secured to the flange 14 of the hub 12. The other end of the resilient element 23 is pivoted to a pivot screw 24 secured to the flange 22. Disposed opposite the outer edge of this C-shaped resilient element is the other stop screw 19. The flange 22 carries two stop screws 25 disposed opposite inner edges of the C-shaped elements 20 and 23.

The various ends of the links are secured to the pivot screws by resilient bushes 26 bonded between steel sleeves 27, 28, the latter sleeves being clamped between the parts through which the pivot screws extend and the others being a firm fit in the ends of the resilient elements, thus these rubber bushes contribute the absorption of torsional shock.

Two pairs of such resilient elements may be arranged at right angles to one another as shown in FIGURES 15 and 16 which elements 20, 23 and 20', 23' respectively and their connecting pins indicated at 15, 21; 18, 24; and 15', 21'; and 18', 24'.

In the arrangement shown in FIGURE 6 a floating member 75 is arranged between the two flanges 14 and 22. The flange 14 is provided with two pivot pins 76, 77 lying on a diameter of the flange, and the flange 22 has two other pivot pins 78, 79 which under no or low load conditions are disposed opposite the pins 76, 77. The floating member has secured to it two co-axial pins 80, 81 on one side of the axis of rotation and two other co-axial pins 82, 83 on the other side of said axis. Under no load conditions these pins are disposed between the two sets of co-axial pins 76, 78 and 77, 79. A C-shaped resilient element 84 is pivotally connected between the pins 77, 81. Another C-shaped element 85 is connected between the pins 76 and 83 on the opposite side of the axis of rotation to the element 84. Another C-shaped element 86 is connected between the pins 78 and 82 and yet another C-shaped element 87 is pivotally connected between the pins 79 and 80.

Where equal characteristics are required in both directions of rotation e.g. for reversing marine drives two springs side by side may be fitted to each pair of pins in diametrically opposite halves of the coupling. Such an arrangement is shown in FIGURES 7 and 8. In this arrangement a pivot pin 65 on the member 14 of the coupling has pivotally connected to it adjacent the member 14 one end of an arcuate resilient element 66, the other end of which is pivotally connected to a pin 67 attached to the other member 22 of the coupling.

The pin 65 has also pivotally connected to it one end of another arcuate resilient element 68, the other end of which is also pivoted to the pivot pin 67 on the member 22. Another pin 69 on the member 14 diametrically opposite to the pin 65 has pivotally connected to it one end of a further arcuate link 70, the other end of which is pivotally connected to a pin 71 attached to the member 22 diametrically opposite the pin 67.

One end of yet a further link 72 is pivotally connected to the pin 71.

In any of the above arrangements the cross sectional area of resilient elements may be substantially the same along the length thereof, or they may vary as shown in FIGURE 9 so that the greatest cross sectional area is at 29 intermediate of their ends 30.

Instead of the ends of the links being pivotally connected by resilient bushes to the parts to which they are attached they may be rigidly clamped as shown in FIGURE 10, for example, by means of bolts 31 which pass through eyes 33 formed at the end of a link 34 and which bolts receive clamping nuts 35.

In the arrangement of the resilient element shown in FIGURE 11 the element 36 is of constant cross sectional area between its ends 37 and 38 and has secured at its centre a weight 39. Such an arrangement is applicable to any of the couplings shown in FIGURES 1 to 8.

As shown in FIGURE 12 each resilient element might be formed from two links 40, 41 pivoted together at 42 and having their other ends 43, 44 pivoted on pins 45, 46 secured to the driving and driven members of the coupling, and which arms are forced apart by a compression spring 47 connected between them.

The resilient element 48 shown in FIGURE 13 may be made up of a number of arcuate laminations 49, 50, 51, 52, the ends of the outer laminations 49 being provided with eyes 53, 54 pivoted on pivot screws 55, 56 secured respectively to the driving and driven members of the coupling. Again this form of resilient element is applicable to any of those couplings shown in FIGURES 1 to 8.

In the arrangement shown in FIGURE 14 each resilient element may be in the form of a linkage made up of a number of links 57, 58, 59 pivotally connected together at 60, 61 by resilient bushes of the form described in connection with FIGURES 3 and 4 and the links 57, 59 being pivotally connected at 62, 63 to pivot screws 64, 65 also by means of resilient bushes.

I claim:

1. A coupling for transmitting a drive between rotatable driving and driven members and comprising:
    (a) at least one pair of resilient connecting elements connected between said members,
    (b) a connection between one end of each resilient element and the driving member,
    (c) a connection between the other end of each resilient element and the driven member,
    (d) the four connections lying in a plane containing the axis of rotation of the coupling when the coupling is transmitting no torque.

2. A coupling according to claim 1 wherein each connected element is resilient to bending about axes parallel to the axis of rotation of the coupling so that when relative rotation takes place between the driving and driven members the distance between the connections at opposite ends of each element alter, causing bending of the elements about said axes.

3. A coupling according to claim 1 wherein substantially the whole of each connecting element lies to one side of said plane containing the axis of rotation of the coupling.

4. A coupling according to claim 3 wherein the two elements of a pair of elements lie on opposite sides respectively of said plane containing the axis of rotation of the coupling.

5. A coupling according to claim 1 wherein there are provided:
    (a) two pairs of connecting elements and wherein
    (b) the plane containing the connections at the ends of the elements of one pair of elements extends substantially at right angles to the plane containing the connections at the ends of the elements of the other pair.

6. A coupling according to claim 1 wherein the two connections between the ends of at least one element and the driving and driven members are disposed on the same side of the axis of rotation of the coupling.

7. A coupling according to claim 1 wherein the two connections between the ends of at least one element and the driving and driven members are disposed on opposite sides of the axis of rotation of the coupling.

8. A coupling according to claim 2 wherein at least one of the members of the coupling carries stop means for limiting the extent of bending of a resilient element so as to increase its stiffness after a predetermined deflection of the element.

9. A coupling according to claim 1 wherein each connecting element is curved.

10. A coupling according to claim 1 wherein each connecting element is C-chaped.

11. A coupling according to claim 1 wherein each connecting element is formed from a number of laminations.

12. A coupling according to claim 1 wherein the connections between the ends of each connecting element and the driving and driven members are pivotal connections.

13. A coupling according to claim 12 wherein each pivotal connection comprises:
- (a) a metal sleeve fixed to the end of the connecting element,
- (b) a metal sleeve fixed to the member of the coupling,
- (c) the two metal sleeves being dispsoed one within the other and
- (d) resilient material being bonded between the metal sleeves.

References Cited by the Examiner

UNITED STATES PATENTS

| | | | |
|---|---|---|---|
| 700,773 | 5/1902 | Hicks | 64—15 |
| 1,654,312 | 12/1927 | Trumpler | 64—12 |
| 1,898,806 | 2/1933 | Baker | 64—19 |
| 2,630,692 | 3/1953 | Naugler | 64—15 |
| 2,837,901 | 6/1958 | Chapman | 64—12 |
| 2,910,844 | 11/1959 | Chapman | 64—19 |

FOREIGN PATENTS

| | | |
|---|---|---|
| 38,491 | 8/1909 | Austria. |
| 210,437 | 6/1909 | Germany. |
| 288,457 | 4/1928 | Great Britain. |

BROUGHTON G. DURHAM, *Primary Examiner.*

H. C. COE, *Assistant Examiner.*